(12) United States Patent
Guo et al.

(10) Patent No.: US 10,262,466 B2
(45) Date of Patent: Apr. 16, 2019

(54) SYSTEMS AND METHODS FOR ADJUSTING A COMBINED IMAGE VISUALIZATION BASED ON DEPTH INFORMATION

(71) Applicant: QUALCOMM Incorporated, San Diego, CA (US)

(72) Inventors: Feng Guo, San Diego, CA (US); Ning Bi, San Diego, CA (US); Bijan Forutanpour, San Diego, CA (US); Tao Zhang, Campbell, CA (US); Jianfeng Ren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/883,406

(22) Filed: Oct. 14, 2015

(65) Prior Publication Data

US 2017/0109940 A1    Apr. 20, 2017

(51) Int. Cl.
| | |
|---|---|
| *G02B 27/01* | (2006.01) |
| *G06T 19/00* | (2011.01) |
| *G06T 19/20* | (2011.01) |
| *G06T 7/00* | (2017.01) |
| *G06T 7/20* | (2017.01) |
| *H04N 7/18* | (2006.01) |
| *G06T 3/00* | (2006.01) |
| *G06T 7/30* | (2017.01) |

(52) U.S. Cl.
CPC ......... *G06T 19/20* (2013.01); *G02B 27/0172* (2013.01); *G06T 3/00* (2013.01); *G06T 7/30* (2017.01); *G06T 19/006* (2013.01); *H04N 7/183* (2013.01); *G02B 2027/014* (2013.01); *G02B 2027/0138* (2013.01); *G02B 2027/0147* (2013.01); *G06T 2200/32* (2013.01); *G06T 2207/10028* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,307,655 B1 * | 12/2007 | Okamoto | G06K 9/00791 348/222.1 |
| 8,300,089 B2 | 10/2012 | Robinson | |
| 8,983,176 B2 | 3/2015 | Kelley et al. | |

(Continued)

OTHER PUBLICATIONS

Criminisi A., et al., "Geodesic Image and Video Editing," ACM Transactions on Graphics, Oct. 2010, vol. 29 (5), pp. 134:1 to 134:15.
Garcia J., et al., "3D Reconstruction for Optimal Representation of Surroundings in Automotive HMIs, Based on Fisheye Multi-Camera Systems", Sep. 24, 2015 (Sep. 24, 2015), XP055316600, 166 pages. Retrieved from the Internet: URL: https://archiv.ub.uniheidelberg.de/volltextserver/19316/7/Esparza_final.pdf [retrieved on Nov. 4, 2016].
International Search Report and Written Opinion—PCT/US2016/049072—ISA/EPO—Nov. 24, 2016.

(Continued)

*Primary Examiner* — Yingchun He
(74) *Attorney, Agent, or Firm* — Austin Rapp; Qualcomm Incorporated

(57) ABSTRACT

A method performed by an electronic device is described. The method includes obtaining a combined image. The combined image includes a combination of images captured from one or more image sensors. The method also includes obtaining depth information. The depth information is based on a distance measurement between a depth sensor and at least one object in the combined image. The method further includes adjusting a combined image visualization based on the depth information.

22 Claims, 11 Drawing Sheets

(56) References Cited

U.S. PATENT DOCUMENTS

| | | | | |
|---|---|---|---|---|
| 2002/0167589 | A1* | 11/2002 | Schofield | B60N 2/002 |
| | | | | 348/148 |
| 2006/0155442 | A1* | 7/2006 | Luo | G06K 9/00369 |
| | | | | 701/45 |
| 2010/0073480 | A1* | 3/2010 | Hoek | G01P 1/08 |
| | | | | 348/148 |
| 2013/0033494 | A1* | 2/2013 | Kiyota | B60R 1/00 |
| | | | | 345/420 |
| 2014/0152778 | A1* | 6/2014 | Ihlenburg | G06T 15/205 |
| | | | | 348/47 |
| 2014/0184754 | A1 | 7/2014 | Suh et al. | |
| 2014/0333729 | A1* | 11/2014 | Pflug | G06T 15/20 |
| | | | | 348/47 |
| 2015/0145966 | A1 | 5/2015 | Krieger et al. | |
| 2015/0302750 | A1* | 10/2015 | Choi | G08G 1/143 |
| | | | | 340/932.2 |

OTHER PUBLICATIONS

Lindner M., et al., "Lateral and Depth Calibration of PMD-Distance Sensors", Advances in Visual Computing Lecture Notes in Computer Science; LNCS, Springer, Berlin, DE, Jan. 1, 2006 (2006-01-01), XP019050872, pp. 524-533, ISBN: 978-3-540-48626-8.

Kaempchen N., et al., "Stereo Vision Based Pose Estimation of Parking Lots Using 3D Vehicle Models", Intelligent Vehicle Symposium, IEEE, Jun. 17, 2002, vol. 2, XP010635867, ISBN: 978-0-7803-7346-4, pp. 459-464.

* cited by examiner

SYSTEMS AND METHODS FOR ADJUSTING A COMBINED IMAGE VISUALIZATION BASED ON DEPTH INFORMATION

FIELD OF DISCLOSURE

The present disclosure relates generally to electronic devices. More specifically, the present disclosure relates to systems and methods for producing an image visualization.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, smart appliances, healthcare equipment, set-top boxes, etc.) capture and/or utilize images. For example, a smartphone may capture and/or process still and/or video images. The images may be processed, displayed, stored and/or transmitted. The images may portray a scene including a landscape and/or objects, for example.

In some cases, images may be distorted. For example, images may be portrayed in a way that distorts the landscape and/or objects in the image. Distortions may be particularly noticeable in some scenarios, such as when wide-angle lenses are employed. As can be observed from this discussion, systems and methods that reduce image distortion may be beneficial.

SUMMARY

A method performed by an electronic device is described. The method includes obtaining a combined image. The combined image includes a combination of images captured from one or more image sensors. The method also includes obtaining depth information. The depth information is based on a distance measurement between a depth sensor and at least one object in the combined image. The method further includes adjusting a combined image visualization based on the depth information.

Adjusting the combined image visualization may include adjusting a rendering geometry based on the depth information. The depth information may be dynamic. Adjusting the combined image visualization may include adjusting the rendering geometry such that the at least one object is rendered on a vertical portion of the rendering geometry.

The method may include inserting at least one model into a three-dimensional space of the image visualization. The model corresponds to the at least one object.

The depth information may indicate a distance between the depth sensor and a nearest object. The at least one object may include multiple objects. The depth information may indicate an average object distance between the depth sensor and the plurality of objects.

The method may include identifying a region of interest based on object detection. The method may also include zooming at least a portion of the combined image visualization based on the region of interest.

Adjusting the combined image visualization may include reducing perspective distortion. The combined image visualization may be a surround view.

An electronic device is also described. The electronic device includes a processor configured to obtain a combined image. The combined image includes a combination of images captured from one or more image sensors. The processor is also configured to obtain depth information. The depth information is based on a distance measurement between a depth sensor and at least one object in the combined image. The processor is further configured to adjust a combined image visualization based on the depth information.

An apparatus is also described. The apparatus includes means for obtaining a combined image. The combined image includes a combination of images captured from one or more image sensors. The apparatus also includes means for obtaining depth information. The depth information is based on a distance measurement between a depth sensor and at least one object in the combined image. The apparatus further includes means for adjusting a combined image visualization based on the depth information.

A computer-program product is also described. The computer-program product includes a non-transitory tangible computer-readable medium with instructions. The instructions include code for causing an electronic device to obtain a combined image. The combined image includes a combination of images captured from one or more image sensors. The instructions also include code for causing the electronic device to obtain depth information. The depth information is based on a distance measurement between a depth sensor and at least one object in the combined image. The instructions further include code for causing the electronic device to adjust a combined image visualization based on the depth information.

DETAILED DESCRIPTION

The systems and methods disclosed herein provide approaches for producing an image visualization. An image visualization may be a rendering and/or presentation of an image. Some image visualizations may fail to represent dimensionality (e.g., height, depth, etc.) or may cause images to appear distorted and/or unnatural. For example, a simple two-dimensional (2D) rendering of a three-dimensional (3D) scene may reduce or destroy the appearance of dimensionality (e.g., height, depth, etc.) of the scene. For instance, a 2D satellite image of a city may cause tall buildings to appear flat. This removes the sense of height of the buildings as they appear in 3D from a closer perspective. Other distortions may occur. Accordingly, an image with a distorted rendering perspective may be less useful and/or less desirable.

The systems and methods disclosed herein may produce an image visualization that may improve the appearance of one or more images. For example, the systems and methods disclosed herein may reduce the appearance of rendering and/or perspective distortion. Additionally or alternatively, the systems and methods disclosed herein may improve the appearance of depth of one or more images. For example, one or more images (e.g., a combined image) may be rendered and/or presented in such a way as to lend greater dimensionality (e.g., height, depth, etc.) to the image(s). The image visualization may be adjusted based on depth information.

Figure 1:
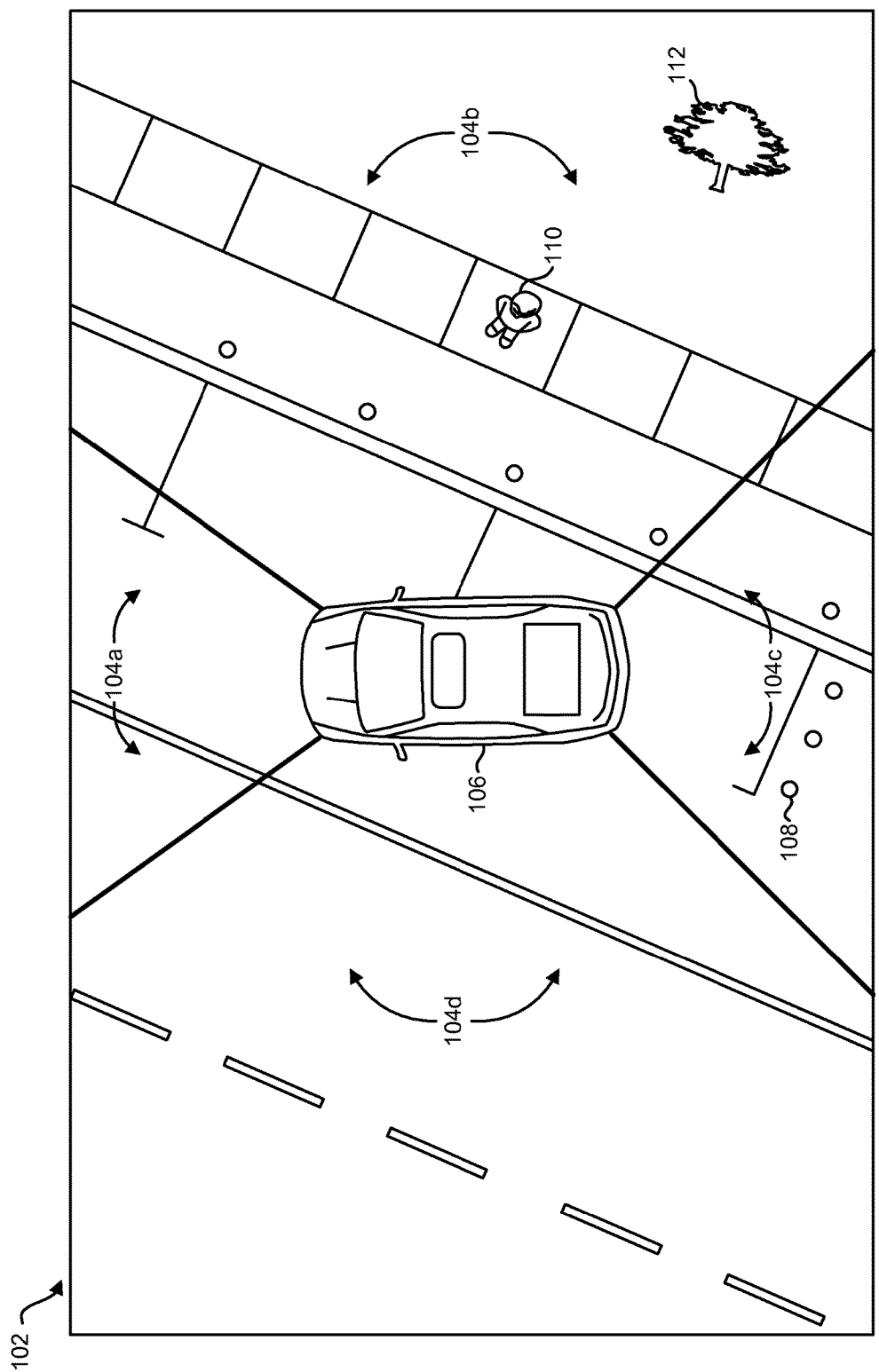
FIG. 1 is a diagram illustrating one example of a top plan view or bird's-eye view image visualization.

FIG. 1 is a diagram illustrating one example of a top plan view or bird's-eye view image visualization 102. A display system may be implemented to show an image visualization. Examples of display systems may include one or more displays, head-mounted displays (HMDs), handheld displays (e.g., smartphones, tablet devices, etc.), integrated console displays in vehicles, etc. Some display systems in an automobile may portray a two-dimensional (2D) bird's-eye view image visualization 102. In some configurations, the display system may be, may be coupled to, or may be part of an advanced driver assistant system (ADAS). In the example shown in FIG. 1, a vehicle 106 includes four cameras. A front camera captures a forward scene 104a, a right side camera captures a right scene 104b, a rear camera captures a rear scene 104c, and a left side camera captures a left scene 104d. Images of the scenes 104a-d may be combined to form a 2D bird's-eye view image visualization 102. As can be observed, the bird's-eye view image visualization 102 focuses on the area around the vehicle 106. It should be noted that the vehicle 106 may be depicted as a model or representation of the actual vehicle 106 in an image visualization.

One disadvantage of the bird's-eye view image visualization 102 is that some objects may appear to be flattened or distorted and may lack a sense of height or depth. For example, a group of barriers 108, a person 110, and a tree 112 may look flat. In a scenario where a driver is viewing the bird's-eye view visualization 102, the driver may not register the height of one or more objects. This could even cause the driver to collide the vehicle 106 with an object (e.g., a barrier 108) because the bird's-eye view image visualization 102 lacks a portrayal of height.

Figure 2:
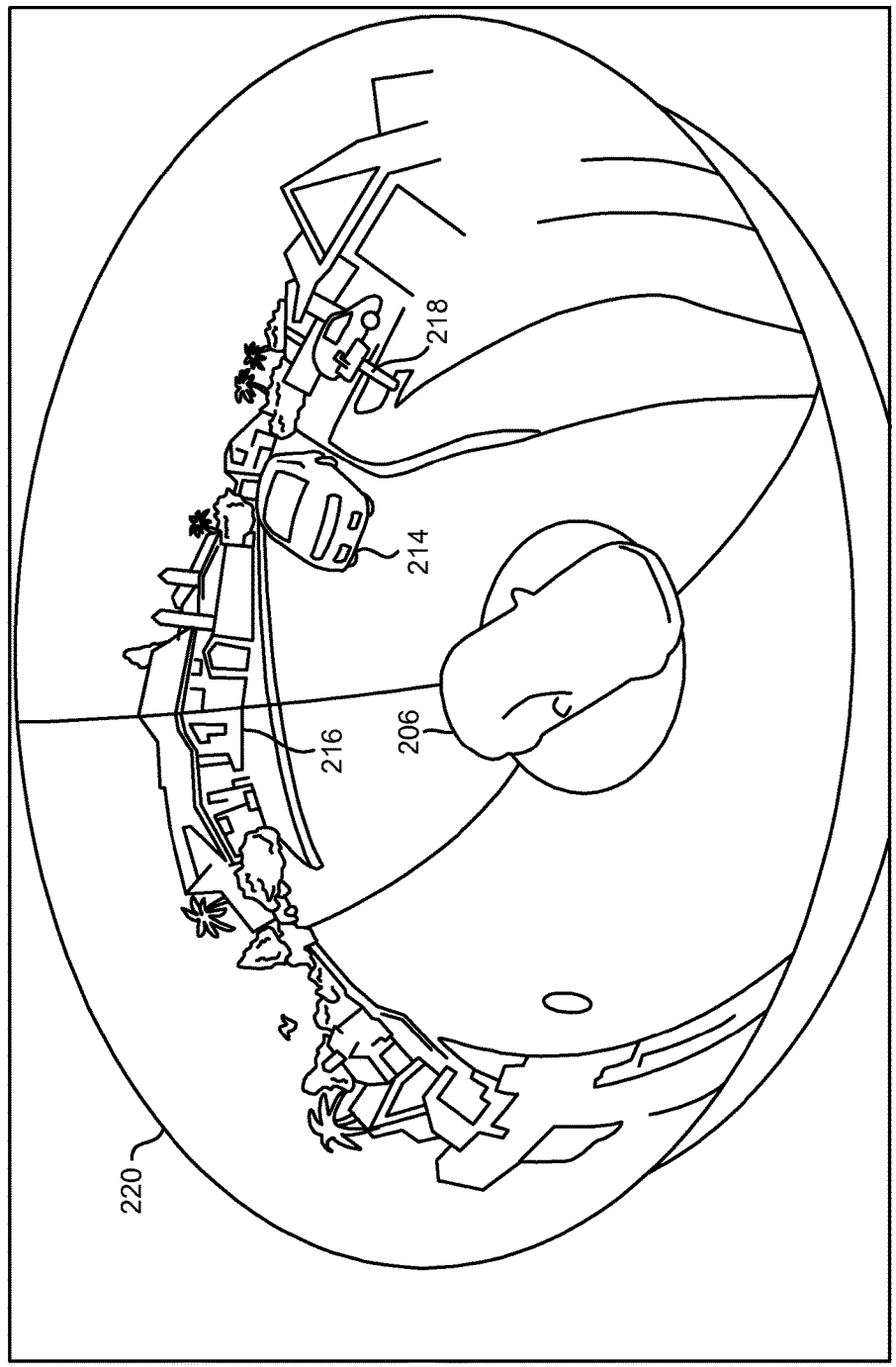
FIG. 2 is a diagram illustrating one example of a surround view image visualization.

FIG. 2 is a diagram illustrating one example of a surround view image visualization 202. For a display system (in an ADAS, for example), an extension of the 2D bird's-eye view image visualization may be the surround view image visualization 202. Images from multiple cameras may be combined to produce a combined image. In this example, the combined image is conformed to a rendering geometry 220 in the shape of a bowl to produce the surround view image visualization 202. As can be observed, the surround view image visualization 202 makes the ground around the vehicle 206 (e.g., vehicle model, representation, etc.) appear flat, while other objects in the image have a sense of height. For example, a house 216, another vehicle 214 and a fire hydrant 218 each appear to have height (e.g., 3 dimensions, height, depth) in the surround view image visualization 202. It should be noted that the vehicle 206 may be depicted as a model or representation of the actual vehicle 206 in an image visualization.

It should also be noted that the surround view image visualization 202 may distort one or more objects based on the shape of the rendering geometry 220 in some cases. For example, if the "bottom" of the bowl shape of the rendering geometry 220 in FIG. 2 were larger, the other vehicle 214 may have appeared flattened. However, if the "sides" of the bowl shape of the rendering geometry 220 were larger, the ground around the vehicle 206 may have appeared upturned, as if the vehicle 206 were in the bottom of a pit. Accordingly, the appropriate shape of the rendering geometry 220 may vary based on the scene. For example, if an object (e.g., an object with at least a given height) is closer to the image sensor, a rendering geometry with a smaller bottom (e.g., base diameter) may avoid flattening the appearance of the object. However, if the scene depicts an open area where tall objects are not near the image sensor, a rendering geometry with a larger bottom (e.g., base diameter) may better depict the scene.

In some configurations of the systems and methods disclosed herein, multiple wide angle fisheye cameras may be utilized to generate a bird's-eye view image visualization and/or a surround view image visualization. The surround view image visualization may be adaptively adjusted based on depth information and/or the scene content. For example, an electronic device may change the image visualization (e.g., the rendering geometry, the projected view, etc.) based on depth information. For example, the depth information may indicate the distance to (e.g., depth of) one or more objects in the image(s), a distance of one or more objects from the cameras, etc. In some configurations, the diameter of a rendering geometry (e.g., a projection of the image) may be controlled based on the depth information.

One example of depth information is the distance to a closest object in the scene (from an electronic device, from an image sensor and/or depth sensor, etc.). Another example of depth information is an average distance (to multiple objects in the scene from an electronic device, from an image sensor and/or a depth sensor, etc.).

In accordance with the systems and methods disclosed herein, the image visualization (e.g., projected view) may be adjusted and/or changed based on the scene (e.g., depth information of the scene). While some projections are 2D and scroll like a movie, the systems and methods disclosed herein may provide a 3D effect (where certain objects may appear to "pop-up," for example). Additionally or alternatively, the image visualization may be adjusted (e.g., updated) dynamically to portray a city view (e.g., a narrower view in which one or more objects are close to the cameras) or a green field view (e.g., a broader view in which one or more objects are further from the cameras). Additionally or alternatively, a region of interest (ROI) may be identified and/or a zoom capability may be set based on the depth or scene from object detection.

Figure 3:
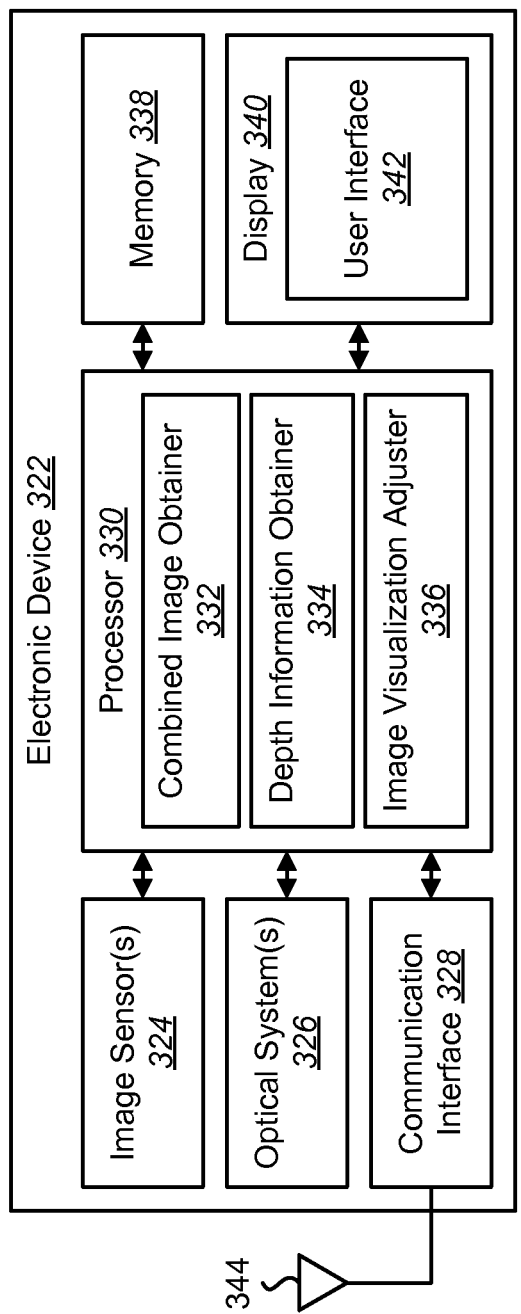
FIG. 3 is a block diagram illustrating one example of an electronic device in which systems and methods for producing an image visualization may be implemented.

FIG. 3 is a block diagram illustrating one example of an electronic device 322 in which systems and methods for producing an image visualization may be implemented. Examples of the electronic device 322 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, etc. The electronic device 322 may include one or more components or elements. One or more of the components or elements may be implemented in hardware (e.g., circuitry) or a combination of hardware and software (e.g., a processor with instructions).

In some configurations, the electronic device 322 may include a processor 330, a memory 338, a display 340, one or more image sensors 324, one or more optical systems 326, and/or a communication interface 328. The processor 330 may be coupled to (e.g., in electronic communication with) the memory 338, display 340, image sensor(s) 324, optical system(s) 326, and/or communication interface 328.

In some configurations, the electronic device 322 may perform one or more of the functions, procedures, methods, steps, etc., described in connection with one or more of FIGS. 4-11. Additionally or alternatively, the electronic device 322 may include one or more of the structures described in connection with one or more of FIGS. 4-11.

The communication interface 328 may enable the electronic device 322 to communicate with one or more other electronic devices. For example, the communication interface 328 may provide an interface for wired and/or wireless communications. In some configurations, the communication interface 328 may be coupled to one or more antennas 344 for transmitting and/or receiving radio frequency (RF) signals. Additionally or alternatively, the communication interface 328 may enable one or more kinds of wireline (e.g., Universal Serial Bus (USB), Ethernet, etc.) communication.

In some configurations, multiple communication interfaces 328 may be implemented and/or utilized. For example, one communication interface 328 may be a cellular (e.g., 3G, Long Term Evolution (LTE), CDMA, etc.) communication interface 328, another communication interface 328 may be an Ethernet interface, another communication interface 328 may be a universal serial bus (USB) interface, and yet another communication interface 328 may be a wireless local area network (WLAN) interface (e.g., Institute of Electrical and Electronics Engineers (IEEE) 802.11 interface). In some configurations, the communication interface 328 may send information (e.g., image information, depth information, image visualization information, etc.) to and/or receive information from another device (e.g., a vehicle, a smart phone, a camera, a display, a remote server, etc.). For example, the electronic device 322 may share information with a vehicle (e.g., another vehicle).

The electronic device 322 may obtain one or more images (e.g., digital images, image frames, video, etc.). For example, the electronic device 322 may include one or more image sensors 324 and/or one or more optical systems 326 (e.g., lenses) that focus images of scene(s) and/or object(s) that are located within the field of view of the optical system(s) 326 onto the image sensor(s) 324. A camera (e.g., a visual spectrum camera) may include at least one image sensor and at least one optical system. In some configurations, the image sensor(s) 324 may capture the one or more images. The optical system(s) 326 may be coupled to and/or controlled by the processor 330. Additionally or alternatively, the electronic device 322 may request and/or receive the one or more images from another device (e.g., one or more external image sensor(s) coupled to the electronic device 322, a network server, traffic camera(s), drop camera(s), automobile camera(s), web camera(s), etc.). In some configurations, the electronic device 322 may request and/or receive the one or more images via the communication interface 328. For example, the electronic device 322 may or may not include camera(s) (e.g., image sensor(s) 324 and/or optical system(s) 326) and may receive images from one or more remote device(s). One or more of the images (e.g., image frames) may include one or more scene(s) and/or one or more object(s).

In some configurations, the electronic device 322 may include an image data buffer (not shown). The image data buffer may buffer (e.g., store) image data from the image sensor 324. The buffered image data may be provided to the processor 330.

In some configurations, the electronic device 322 may include a camera software application and/or a display 340. When the camera application is running, images of objects that are located within the field of view of the optical system(s) 326 may be captured by the image sensor(s) 324. The images that are being captured by the image sensor(s) 324 may be presented on the display 340. In some configurations, these images may be displayed in rapid succession at a relatively high frame rate so that, at any given moment in time, the scene(s) and/or object(s) that are located within the field of view of the optical system 326 are presented on the display 340. The one or more images obtained by the electronic device 322 may be one or more video frames and/or one or more still images. In some configurations, the display 340 may present additional or alternative information. For example, the display 340 may present one or more regions of interest (e.g., bounding boxes) corresponding to one or more detected and/or tracked objects. Additionally or alternatively, the display 340 may present depth information (e.g., one or more estimated distances to one or more objects (e.g., selected objects) in an image visualization).

The processor 330 may include and/or implement a combined image obtainer 332. One or more of the image frames may be provided to the combined image obtainer 332. In some configurations, the combined image obtainer 332 may operate in accordance with one or more of the approaches, functions, procedures, steps and/or structures described in connection with one or more of FIGS. 4-5 and 10. The combined image obtainer 332 may obtain a combined image. A combined image may be a combination of images. For example, multiple images may be stitched together to form a combined image. The multiple images used to form the combined image may be captured from a single image sensor (e.g., one image sensor at multiple positions (e.g., angles, rotations, locations, etc.)) or may be captured from multiple image sensors (at different locations, for example). As described above, the image(s) may be captured from the image sensor(s) 324 included in the electronic device 322 or may be captured from one or more remote image sensor(s).

In some configurations, the combined image obtainer 332 may combine the images to form the combined image. For example, the combined image obtainer 332 may perform image alignment (e.g., registration), seam finding and/or merging. Image alignment may include determining an overlapping area between images and/or aligning the images. Seam finding may include determining a seam in an overlapping area between images. The seam may be generated in order to improve continuity (e.g., reduce discontinuity) between the images. For example, the combined image obtainer 332 may determine a seam along which the images match well (e.g., where edges, objects, textures, color and/or intensity match well). Merging the images may include joining the images (along a seam, for example) and/or discarding information (e.g., cropped pixels).

It should be noted that in some configurations, the image alignment (e.g., overlapping area determination) and/or the seam finding may be optional. For example, the cameras (e.g., image sensor(s) 324 and optical system(s) 326) may be calibrated offline such that the overlapping area and/or seam are predetermined. In these configurations, the images may be merged based on the predetermined overlap and/or seam.

In some configurations, the combined image obtainer 332 may request and/or receive one or more combined images. For example, the combined image obtainer 332 may request and/or receive a combined image from a remote device (e.g., external camera(s), remote server, remote electronic device, etc.) via the communication interface 328. In these configurations, the combined image obtainer 332 may not combine images (e.g., may not perform image alignment, seam finding, and/or merging).

In some configurations, the combined image obtainer 332 may be optional. For example, the image visualization adjustment may be performed on a single image and/or on non-combined images.

The processor 330 may include and/or implement a depth information obtainer 334. The depth information obtainer 334 may obtain depth information. The depth information indicates a distance to at least one object in an image (e.g., in the combined image). For example, the depth information may indicate a distance between the electronic device 322 and one or more objects (e.g., a distance to a closest object, an average distance to multiple objects, etc.). Additionally or alternatively, the depth information may indicate a distance between at least one sensor (e.g., image sensor(s) 324, other depth sensor(s)) and one or more objects (e.g., a distance to a closest object from the depth sensor(s), an average distance to multiple objects from the depth sensor(s), etc.). In some configurations, the depth information may include one or more depth maps. In some configurations, the depth information obtainer 334 may operate in accordance with one or more of the approaches, functions, procedures, steps and/or structures described in connection with one or more of FIGS. 4-10. It should be noted that while a distance measurement may be taken from the location of a sensor, the measured distance may or may not be mapped (e.g., transformed) relative to another point in some configurations. For example, the electronic device 322 may map the distance measurement to be relative to an arbitrary point (e.g., the center of a vehicle, the center of a device, etc.). This may allow the distance measurement to correspond (e.g., coincide) with a rendering geometry that is located (e.g., centered) at a different point than the location of the depth sensor(s).

Obtaining the depth information may be performed based on multiple images (e.g., stereoscopic depth determination), motion information, and/or other depth sensing. In some approaches, one or more cameras (e.g., image sensor(s) and/or optical system(s)) may be depth sensors and/or may be utilized as depth sensors. In some configurations, for example, the depth information obtainer 334 may receive multiple images (from the image sensor(s) 324 and/or from remote image sensor(s)). The depth information obtainer 334 may triangulate one or more objects in the images (in overlapping areas of the images, for instance) to determine the distance between an image sensor and the one or more objects. For example, the 3D position of feature points (referenced in a first camera coordinate system) may be calculated from two (or more) calibrated cameras. Then, the depth may be estimated through triangulation.

In some configurations, the depth information obtainer 334 may determine the depth information based on moving cameras (e.g., an approach referred to as structure from motion (SfM)). For example, depth may be estimated based on two or more frames due to camera motion (e.g., the motion of the camera(s) relative to one or more objects in a scene). For instance, by observing the motion of an object over time (in images over time or frames, for instance), the depth information obtainer 334 may determine a distance between the image sensor (e.g., image sensor(s) 324 and/or remote image sensor(s)) and the object. The object points from two views may be matched and the relative camera motion may be estimated. Then, the structure and/or depth of the object may be estimated (e.g., generated) by triangulation.

In some configurations, the depth information obtainer 334 may obtain depth information by utilizing one or more additional or alternative depth sensing approaches. For example, the depth information obtainer 334 may receive information from a depth sensor (in addition to or alternatively from one or more visual spectrum cameras) that may indicate a distance to one or more objects. Examples of other depth sensors include time-of-flight cameras (e.g., infrared time-of-flight cameras), interferometers, radar, lidar, sonic depth sensors, ultrasonic depth sensors, etc. One or more depth sensors may be included within, may be coupled to, and/or may be in communication with the electronic device 322 in some configurations. The depth information obtainer 334 may estimate (e.g., compute) depth information based on the information from one or more depth sensors and/or may receive depth information from the one or more depth sensors. For example, the depth information obtainer 334 may receive time-of-flight information from a time-of-flight camera and may compute depth information based on the time-of-flight information.

Additionally or alternatively, the depth information obtainer 334 may request and/or receive depth information directly from one or more depth sensors (in configurations where the depth sensor directly provides depth information, for example). For instance, the depth information obtainer 334 may receive depth information from one or more visual spectrum cameras, one or more infrared time-of-flight cameras, interferometers, lidar, radar, sonic/ultrasonic depth sensors, etc. In some configurations, the depth information may include one or more depth maps (which may correspond to the one or more images, for example).

In some configurations, a combination of approaches for obtaining depth information (e.g., multi-modal depth) may be implemented. For example, a combination of SfM, stereoscopic triangulation, and lidar may be implemented. Other combinations may be implemented. Utilizing multi-modal depth estimation may improve the quality of the depth information. For example, depth information from different sensors may be utilized to filter outliers and/or reduce noise (by merging (e.g., averaging) and/or interpolating multiple depth maps, etc., for instance).

The depth information may indicate the presence of one or more objects in one or more scenes. An object may be a physical body of matter. In some configurations, only some physical bodies of matter in the scene may be detected as "objects." For example, only physical bodies of matter that have at least a minimum height may be detected by the electronic device 322 as "objects" in some configurations. For instance, a pebble that is less than a centimeter (cm) high may not be detected as an "object" in some configurations.

The minimum height may be predetermined and/or adjustable. For example, a curb height of approximately 10 cm high may be detected as an object in some configurations, but may not be detected as an object in other configurations. One or more additional or alternative criteria (e.g., width, depth, motion, type, etc.) may be utilized to determine whether a physical body is an "object" for purposes of image visualization adjustment. Accordingly, the electronic device 322 may determine whether one or more physical bodies in a scene are "objects" based on one or more criteria. This may improve image visualization adjustment by performing adjustment only based on physical bodies that are considered significant and/or relevant (e.g., by filtering out physical bodies that might cause the image visualization adjustment to operate based on depth information corresponding to irrelevant and/or insignificant physical bodies).

In some configurations, the electronic device 322 may determine and/or utilize physical body type(s) for purposes of image visualization adjustment. For example, the electronic device 322 (e.g., a processor 330 and/or an physical body type detector included in the processor 330) may determine a physical body type for one or more detected physical bodies. In some configurations, the processor 330 may perform physical body recognition (e.g., object recognition) on one or more detected physical bodies in one or more images to determine one or more physical body types. For example, the electronic device (e.g., processor 330) may compare one or more physical body attributes (e.g., keypoints, dimensions, color, etc.) to a database of known physical bodies. If the one or more physical body attributes match one or more physical body attributes of a known physical body (to a degree of certainty, for example), the electronic device 322 may label the corresponding detected physical body as the type of known physical body. In other configurations, a remote device may determine one or more physical body types. The electronic device 322 may receive physical body type information.

In some configurations, the electronic device 322 (e.g., processor 330) may utilize the physical body type(s) for purposes of image visualization adjustment. For example, the electronic device 322 (e.g., processor 330) may perform image visualization adjustment only for certain physical body types and/or may disregard physical bodies that are not the certain physical body types. For example, the image visualization adjuster 336 may adjust an image visualization for cars, buildings, people, animals (e.g., dogs), certain plants (e.g., trees with a sufficient height, bushes with a sufficient height, etc.), barriers, etc. However, the image visualization adjuster 336 may disregard physical bodies such as trash and certain plants (e.g., grass, weeds, low-lying ground cover, etc.). In this way, the image visualization adjuster 336 may help in providing a sense of height (e.g., depth) to more relevant physical bodies. In addition to depth information, physical body type may be used in addition to or alternatively from physical body height for performing image visualization adjustment in some configurations.

The processor 330 may include and/or implement an image visualization adjuster 336. The image visualization adjuster 336 may generate and/or adjust an image visualization based on the depth information. For example, the image visualization adjuster 336 may adjust a rendering geometry based on the depth information. More specifically, the depth information may be used to adjust the shape of a 3D display and/or to generate a 3D surround view for display, virtual reality and/or augmented reality (e.g., for use in an Oculus Rift device, HoloLens device, etc.). In some configurations, the image visualization adjuster 336 may operate in accordance with one or more of the approaches, functions, procedures, steps and/or structures described in connection with one or more of FIGS. 4-10.

A rendering geometry may be a shape onto which an image is rendered (e.g., mapped, projected, etc.). For example, an image (e.g., a combined image) may be rendered in the shape of a bowl (e.g., bowl interior), a cup (e.g., cup interior), a sphere (e.g., whole sphere interior, partial sphere interior, half-sphere interior, etc.), a spheroid (e.g., whole spheroid interior, partial spheroid interior, half-spheroid interior, etc.), a cylinder (e.g., whole cylinder interior, partial cylinder interior, etc.), an ellipsoid (e.g., whole ellipsoid interior, partial ellipsoid interior, half-ellipsoid interior, etc.), polyhedron (e.g., polyhedron interior, partial polyhedron interior, etc.), trapezoidal prism (e.g., trapezoidal prism interior, partial trapezoidal prism interior, etc.), etc. In some approaches, a "bowl" (e.g., multilayer bowl) shape may be a (whole or partial) sphere, spheroid, or ellipsoid with a flat (e.g., planar) base. A rendering geometry may or may not be symmetrical. It should be noted that the electronic device 322 (e.g., image visualization adjuster 336) may insert a model (e.g., 3D model) or representation of the electronic device 322 (e.g., vehicle, drone, etc.) in an image visualization. The model or representation may be predetermined in some configurations. For example, no image data may be rendered on the model in some configurations.

Some rendering geometries may include an upward or vertical portion. For example, at least one "side" of bowl, cup, cylinder, box, or prism shapes may be the upward or vertical portion. For example, the upward or vertical portion of shapes that have a flat base may begin where the base (e.g., horizontal base) transitions or begins to transition upward or vertical. For example, transition (e.g., transition edge) of a bowl shape may be formed where the flat (e.g., planar) base intersects with the curved (e.g., spherical, elliptical, etc.) portion. It may be beneficial to utilize a rendering geometry with a flat base, which may allow the ground to appear more natural. Other shapes (e.g., sphere, ellipsoid, etc.) may be utilized that may have a curved base. For these shapes (and/or for shapes that have a flat base), the upward or vertical portion may be established at a distance from the center (e.g., bottom center) of the rendering geometry and/or a portion of the shape that is greater than or equal to a particular slope. Image visualizations in which the outer edges are upturned may be referred to as "surround view" image visualizations.

In some configurations, the image visualization may be adjusted in order to avoid and/or reduce distortion of one or more objects in a scene. For example, adjusting the image visualization may include reducing (perspective or rendering) distortion to more accurately portray the scene. One type of distortion that may be avoided and/or reduced is the flattening of objects in a scene. For instance, some objects with significant height such as people, trees, buildings, etc., may appear to be flattened when rendered on the bottom of a bowl-shaped surround view. The systems and methods described herein may adjust the visualization (e.g., the shape of the surround view, the diameter of the "bowl," etc.) in order to avoid flattening one or more objects. For example, in a "city" view, objects at a closer distance may be rendered on the sides of the "bowl," whereas in a "greenfield" view, objects at a larger distance may be rendered on the sides of the "bowl." In some configurations, a visual object (e.g., a "pop-up" object, a sprite, a 3D model, etc.) may be inserted in order to render one or more objects with less distortion. A parallax effect may result (where foreground objects may appear to move relative to background), which may provide the appearance of depth in the image visualization.

The electronic device 322 may present the image visualization (e.g., the combined image visualization) on the display 340. For example, the processor 330 may provide the image visualization to the display 340, which may present the image visualization.

Adjusting the image visualization based on the depth information may include changing the rendering geometry. For example, adjusting the image visualization may include adjusting one or more dimensions and/or parameters (e.g., radius, diameter, width, length, height, curved surface angle, corner angle, circumference, size, distance from center, etc.) of the rendering geometry. It should be noted that the rendering geometry may or may not be symmetric.

In some examples, a rendering geometry may be expressed as $$\frac{x^2}{a^2} + \frac{y^2}{b^2} + \frac{z^2}{c^2} = d^2,$$

where x is a first dimension, y is a second dimension, z is a third dimension, a is the radius of the rendering geometry along the first dimension (e.g., length), b is the radius of the rendering geometry along the second dimension (e.g., width), c is the radius of the rendering geometry along the third dimension (e.g., height), and d is a scalar of the geometry size. Adjusting the rendering geometry may include adjusting any of the parameters (e.g., a, b, c, and/or d) based on the depth information. For example, the length and width of the rendering geometry may be adjusted to approximately match the distance to the object with the nearest depth. In another example, the length and width may be different. For instance, when a vehicle is driving through a narrow but long passage (e.g., a tunnel, parking garage, etc.), the width of the rendering geometry may be adjusted to be relatively small, while the length may be adjusted to be relatively large.

In some configurations, adjusting the image visualization may include changing where (e.g., the distance from the electronic device, camera and/or image sensor) an upturn or vertical edge of the rendering geometry occurs. The upturn or vertical edge may be where the rendering geometry transitions or begins to transition from the base (e.g., a flat base) to upward (e.g., vertical). For instance, the upturn or vertical edge may be adjusted such that it corresponds to (e.g., is within some distance from) a nearest object distance (or average object depth, for example). Accordingly, adapting the image visualization may include adjusting the rendering geometry such that one or more objects are rendered on an upward or vertical portion of the rendering geometry.

In some configurations, the adjustments may be made only within a range that excludes one or more extremes. For example, the rendering geometry may be changed within a range of 1 meter to 100 meters relative to the depth information (e.g., the nearest object distance, average object depth, etc.). In this example, if the depth information indicates that a nearest object is further away than 100 meters, the rendering geometry may only be adjusted to 100 meters and not further. In other configurations, no range limits may be utilized.

In some examples, a base or bottom area of the shape (e.g., bowl, cylinder, cup, etc.) may be adjusted. For instance, the base radius may be adjusted to extend to a distance that is less than or equal to (e.g., within an amount that is less than) the distance to the nearest object (or average object distance). In one example, the base diameter may be adjusted such that the base extends to be within approximately a meter of the nearest object distance. Accordingly, the base diameter may be expanded if the nearest object (or average object depth) is further away and/or may be contracted if the nearest object (or average object depth) is closer.

The image visualization may be presented from a viewpoint (e.g., perspective, camera angle, etc.). For example, the image visualization may be presented from a top-down viewpoint, a back-to-front viewpoint (e.g., raised back-to-front, lowered back-to-front, etc.), a front-to-back viewpoint (e.g., raised front-to-back, lowered front-to-back, etc.), an oblique viewpoint (e.g., hovering behind and slightly above, other angled viewpoints, etc.), etc. Additionally or alternatively, the image visualization may be rotated and/or shifted.

In some configurations, adjusting the image visualization based on depth information may include adjusting the viewpoint, rotation, and/or shift of the image visualization. In some approaches, when one or more objects are nearer, the viewpoint may be adjusted to "zoom in" more closely to the electronic device (e.g., vehicle). This may present greater detail for situations in which object(s) are located close to the electronic device. Conversely, when object(s) are not nearby, but are further away, the viewpoint may "zoom out" to present a wider view. In other approaches, the viewpoint may "zoom in" and reduce the angle to the ground when one or more objects are further away. This may provide a more natural perspective for open spaces. The viewpoint may "zoom out" and increase the angle to the ground (for more of a "top-down" view) when one or more objects are at a medium distance. This may better illustrate all of the surroundings, including to the rear (which may help when navigating a parking lot, for example). The viewpoint may "zoom in" and decrease the angle to the ground when one or more objects are close by. This may illustrate more detail in tighter spaces (which may help when driving in a tight corridor, tunnel, or garage, for example).

Additionally or alternatively, the rendering geometry may be shifted and/or rotated based on the depth information. For example, if an object is near the side-view mirror housing of the vehicle, the rendering geometry may be shifted and/or rotated to better present the object in relation to the side view mirror housing (e.g., to avoid collisions when moving the vehicle into a tight space, such as next to a wall or parking garage pillar).

Some configurations of the systems and methods disclosed herein may also provide free view rendering, where the visualization may be rendered from any viewpoint (e.g., any rendering angle) or given ranges of viewpoints. In some configurations, the image visualization may be adjusted based on user interface 342 input. For example, the user interface 342 (e.g., a touchscreen) may receive an input that indicates a rotation, shift, and/or zoom of the image visualization. For example, the image visualization adjuster may change the rotation of the image visualization based on a swipe, which may indicate a rotation in the swipe direction, may change the shift of the image visualization based on a multi-touch swipe (e.g., two-finger swipe), may indicate a shift in the swipe direction, and/or may change the zoom of the image visualization based on a multi-touch pinch or spread.

In some configurations, adjusting the image visualization may include switching rendering geometries based on the depth information. For example, if a vehicle is approaching a wall (in forward or reverse), the rendering geometry may be switched from a bowl shape to a rectangular shape in order to reduce the appearance of a curved wall.

In some configurations, adjusting the image visualization may include marking and/or highlighting one or more objects in the image visualization based on the depth information. For example, the image visualization adjuster 336 may emphasize (e.g., outline, color, etc.) one or objects based on the depth information. For example, the image visualization adjuster 336 may highlight one or more objects green, yellow, or red based on their distance from the electronic device 322. For instance, objects within one or more distance ranges (e.g., distance thresholds) may be highlighted (e.g., "painted"). In one approach, objects that are between 2-3 meters (m) from the electronic device 322 may be highlighted green, objects between 1-2 m may be highlighted yellow, and objects between 0-1 m may be highlighted red. Other color continuums may be utilized. This may be different from other approaches that merely overlay a static frame or lines on an image to present depth.

In some configurations, adjusting the image visualization may be performed based on dynamic data. For example, adjusting the image visualization may be performed based on dynamically sensed depth information (e.g., depth information that is obtained by the electronic device 322 dynamically, in real-time, real distance information, not generally indicated map data, etc.). For instance, the electronic device 322 may not rely on predetermined depth information in some configurations. In some configurations, adjusting the image visualization may not be based on predetermined map data or may be based on dynamic depth information in addition to the predetermined map data. This may be beneficial by allowing the image visualization adjustment to be flexible and responsive to changing conditions. For example, even if the electronic device 322 enters an area that is typically or historically an open space, the electronic device 322 may still adjust the image visualization to display a narrower view if one or more objects are currently nearby (e.g., one or more cars are nearby on a road with open surroundings, new construction has created a narrower scene, a pedestrian/cyclist is walking nearby, temporary construction barriers are nearby, etc.). Moreover, the systems and methods disclosed herein may be beneficial to adjust an image visualization even in situations where no map or predetermined data is available (e.g., in a garage or indoor parking space that may not have a map or predetermined data).

It should be noted that adjusting the image visualization may not include combining images in some configurations. For example, adjusting the image visualization may not include stitching or re-stitching images. In some configurations, the combined image may be determined separately from (e.g., not based on) adjusting the image visualization. For instance, adjusting the image visualization may change the rendering geometry for the image (e.g., combined image), but may not change the image data (e.g., pixel data) itself and/or may not change how multiple images are combined.

In some configurations, the electronic device 322 may insert one or more 3D models (e.g., pop-up items) into a 3D space of the image visualization. The model(s) may correspond to the at least one object (e.g., an object in the scene that may not be the electronic device 322 and/or may not be coupled to the electronic device 322). For example, the electronic device 322 may generate a model (e.g., 2D model, 3D model, sprite, etc.) upon which image data corresponding to an object may be rendered. In some configurations, the model may be generated based on the depth information. For example, the electronic device 322 may generate one or more models that represent the location, size, and/or shape of one or more objects. The electronic device 322 may insert the one or more models into the 3D space of the image visualization and/or may render image data corresponding to the one or more objects on the one or more models. It should be noted that the one or more models may be separate from a predetermined model inserted into the image visualization (e.g., a model of a vehicle or drone that may not have dynamic or real-time image data rendered thereon).

In some approaches, the depth information may include a depth map corresponding to the one or more images (e.g., a combined image). The electronic device 322 may generate the one or more models for one or more objects indicated in the depth map (within a threshold distance, for example). For instance, the electronic device 322 may generate one or more 2D and/or 3D models that match (e.g., approximate) the location, size, and/or shape of the one or more objects. In one example, a vehicle driving through a scene may be nearby a barrier, a person, a tree, and a building. The electronic device 322 may obtain a depth map (via stereoscopic triangulation, structure from motion (SfM), infrared time-of-flight camera, lidar, and/or radar, etc.) that indicates the location (e.g., distance), size, and/or shape of the barrier, person, tree, and building. The electronic device 322 may insert models with corresponding locations, sizes, and shapes into the 3D space of the image visualization. The electronic device 322 may render image data corresponding to the barrier, person, tree, and building on the corresponding models in the image visualization. Inserting one or more models in the image visualization may give the image visualization a sense of depth. As the electronic device 322 moves through the scene, for example, the image visualization may exhibit a parallax effect with the model(s) against the background.

In some configurations, the electronic device 322 may identify a region of interest (ROI) in the one or more images (e.g., combined image). For example, the electronic device 322 may perform object detection based on the one or more images and/or based on the depth information. For instance, the electronic device 322 may detect objects such as signs, road signs, traffic signs, traffic signals, people, faces, symbols (e.g., characters, text, numbers, etc.), vehicles, buildings, obstructions, etc. The electronic device 322 may identify the ROI based on the detected object. For example, the ROI may be a region that is established relative to the detected object. In some configurations, the electronic device 322 may bound the detected object with a bounding box. The ROI may be region included within the bounding box. The electronic device 322 may zoom at least a portion of the image visualization (e.g., combined image visualization) based on the ROI. In one example, the electronic device 322 (e.g., image visualization adjuster 336) may change the viewpoint in order to enlarge the ROI. In another example, the electronic device 322 (e.g., image visualization adjuster 336) may generate a magnifying window on the display 340 that presents a zoomed version of the ROI. In some configurations, the electronic device 322 (e.g., processor 330 and/or display 340) may generate one or more lines connecting the magnifying window to the location of the ROI in the image visualization.

The memory 338 may store instructions and/or data. The processor 330 may access (e.g., read from and/or write to) the memory 338. Examples of instructions and/or data that may be stored by the memory 338 may include image data, image combining data (e.g., seam location data), depth information, image visualization data (e.g., rendering geometry data, rendering geometry parameters, rendering geometry viewpoint data, rendering geometry shift data, rendering geometry rotation data, etc.), object data (e.g., location, size, shape, etc.), model data, combined image obtainer 332 instructions, depth information obtainer 334 instructions, and/or image visualization adjuster 336 instructions, etc.

In some configurations, the electronic device 322 may present a user interface 342 on the display 340. For example, the user interface 342 may enable a user to interact with the electronic device 322. In some configurations, the user interface 342 may enable a user to indicate preferences (e.g., image visualization settings) and/or interact with the image visualization. For example, the user interface 342 may receive one or more commands for changing the image visualization (e.g., zooming in or out, rotating the image visualization, shifting the image visualization, changing image visualization shape, changing the image visualization viewpoint, etc.). Additionally or alternatively, the user interface 342 may receive an input (e.g., a tap) that indicates a selection of an object in the image visualization. In some configurations, the selected object may be tracked. For example, the selected object may be tracked over multiple camera views. Additionally or alternatively, the image visualization adjuster 336 may adjust the image visualization based on the selected object. In some approaches, the image visualization adjuster 336 may adjust the rendering geometry based on the selected object (in addition to or alternatively from a nearest object distance and/or object distance average, for instance). For example, the image visualization adjuster 336 may adjust the rendering geometry shape, size, viewpoint, shift, and/or rotation based on the selected object (in order to maintain a view of the selected object, to reduce distortion of the selected object, etc.).

In some configurations, the display 340 may be a touchscreen that receives input from physical touch (by a finger, stylus or other tool, for example). For instance, the touchscreen may be an input interface that receives a touch input indicating user preference(s) and/or one or more modifications to the image visualization. Additionally or alternatively, the electronic device 322 may include or be coupled to another input interface. For example, the electronic device 322 may include a camera facing a user and may detect user gestures (e.g., hand gestures, arm gestures, eye tracking, eyelid blink, etc.). In another example, the electronic device 322 may be coupled to a mouse and may detect a mouse click indicating an input.

It should be noted that no user input may be necessary in some configurations. For example, the electronic device 322 may automatically adjust an image visualization as described herein.

In some configurations, the electronic device 322 (e.g., processor 330) may optionally be coupled to, be part of (e.g., be integrated into), include and/or implement an advanced driver assistance system (ADAS). For example, the electronic device 322 may present the image visualization in a vehicle (on an in-dash display, a console display, a windshield projector, a heads-up display, optical head mounted display, etc.). This may assist the driver in situational awareness and/or collision avoidance.

The electronic device 322 (e.g., processor 330) may optionally be coupled to, be part of (e.g., be integrated into), include and/or implement one or more other kinds of devices. For example, the electronic device 322 may be implemented in a drone equipped with cameras. The image visualization adjustment may convey a greater sense of dimensionality (e.g., height, depth, etc.), better detail in narrow spaces and/or wider views in open spaces where the drone is currently travelling. In another example, the electronic device 322 (e.g., processor 330) may be implemented in an action camera (including one or more image sensors and/or lenses). The image visualization adjustment may convey a greater sense of dimensionality (e.g., height, depth, etc.) in wide-angle views, better detail in narrow spaces and/or wider views in open spaces where the action camera is currently travelling.

Figure 4:
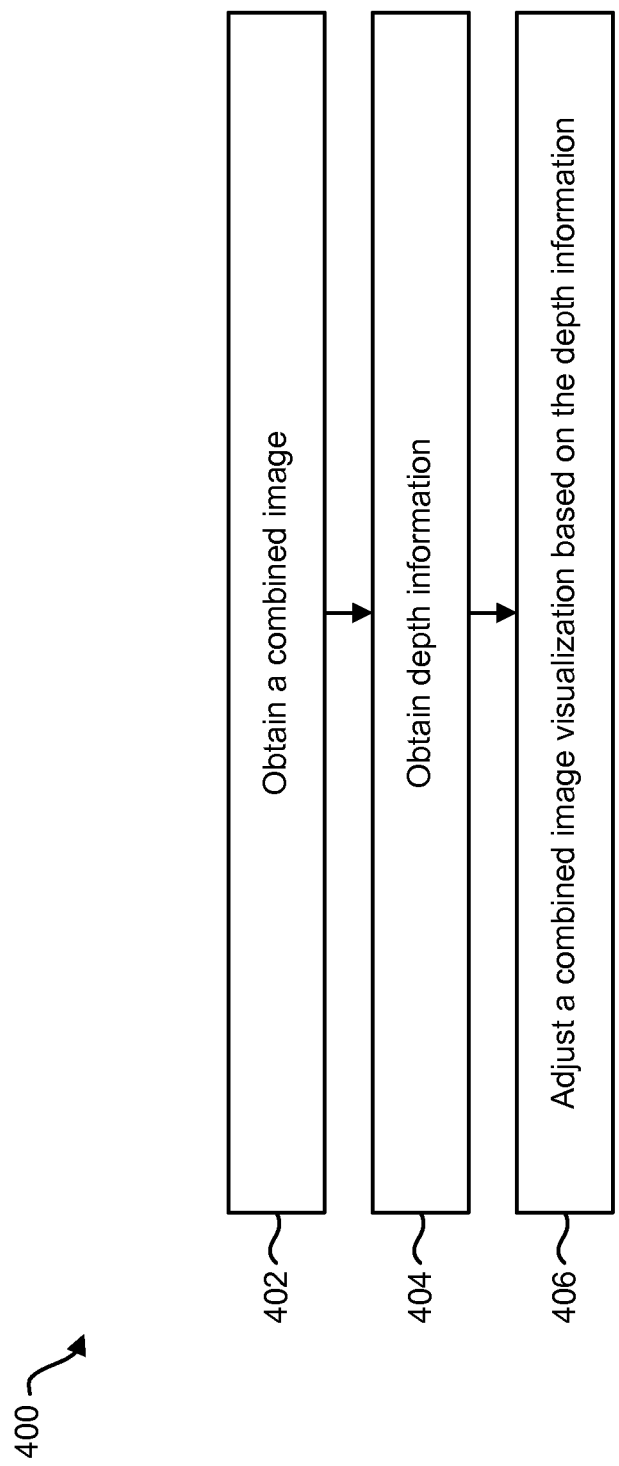
FIG. 4 is a flow diagram illustrating one configuration of a method for producing an image visualization.

FIG. 4 is a flow diagram illustrating one configuration of a method 400 for producing an image visualization. The method 400 may be performed by the electronic device 322 described herein, for example.

The electronic device 322 may obtain 402 a combined image. This may be accomplished as described in connection with one or more of FIGS. 1-3. For example, the electronic device 322 may combine multiple images from one or more image sensors to produce a combined image. In some configurations, the electronic device 322 may perform image alignment, seam finding and/or merging. Additionally or alternatively, the electronic device 322 may request and/or receive one or more combined images from another device.

The electronic device 322 may obtain 404 depth information. This may be accomplished as described in connection with FIG. 3. For example, the electronic device 322 may obtain 404 depth information based on one or more images from one or more visual spectrum cameras. This may be accomplished through stereoscopic triangulation and/or motion information. Additionally or alternatively, the electronic device 322 may obtain 404 depth information based on information from one or more other depth sensors (e.g., time-of-flight cameras, interferometers, radar, lidar, sonic depth sensors, ultrasonic depth sensors, etc.). Additionally or alternatively, the electronic device 322 may request and/or receive the depth information directly from one or more depth sensors (e.g., one or more integrated and/or remote depth sensors and/or depth sensing devices).

The electronic device 322 may adjust 406 a combined image visualization based on the depth information. This may be accomplished as described in connection with FIG. 3. For example, the electronic device 322 may adjust the rendering geometry, viewpoint, rotation, and/or shift of the combined image visualization based on depth information. Additionally or alternatively, the electronic device 322 may add at least one model, switch the rendering geometry, and/or mark (and/or highlight) one or more objects in the combined image visualization based on the depth information.

In some configurations, the electronic device 322 may display the combined image visualization. This may be accomplished as described in connection with FIG. 3. For example, the electronic device 322 (e.g., processor 330) may provide the combined image visualization to a display (e.g., a display 340 included in the electronic device 322 or to a display that is coupled to and/or in communication with the electronic device 322). The display may present the combined image visualization. It should be noted that one or more of the functions, procedures, and/or steps described in connection with FIGS. 3 and 4 may alternatively be performed on a single (e.g., non-combined) image in some configurations.

Figure 5:
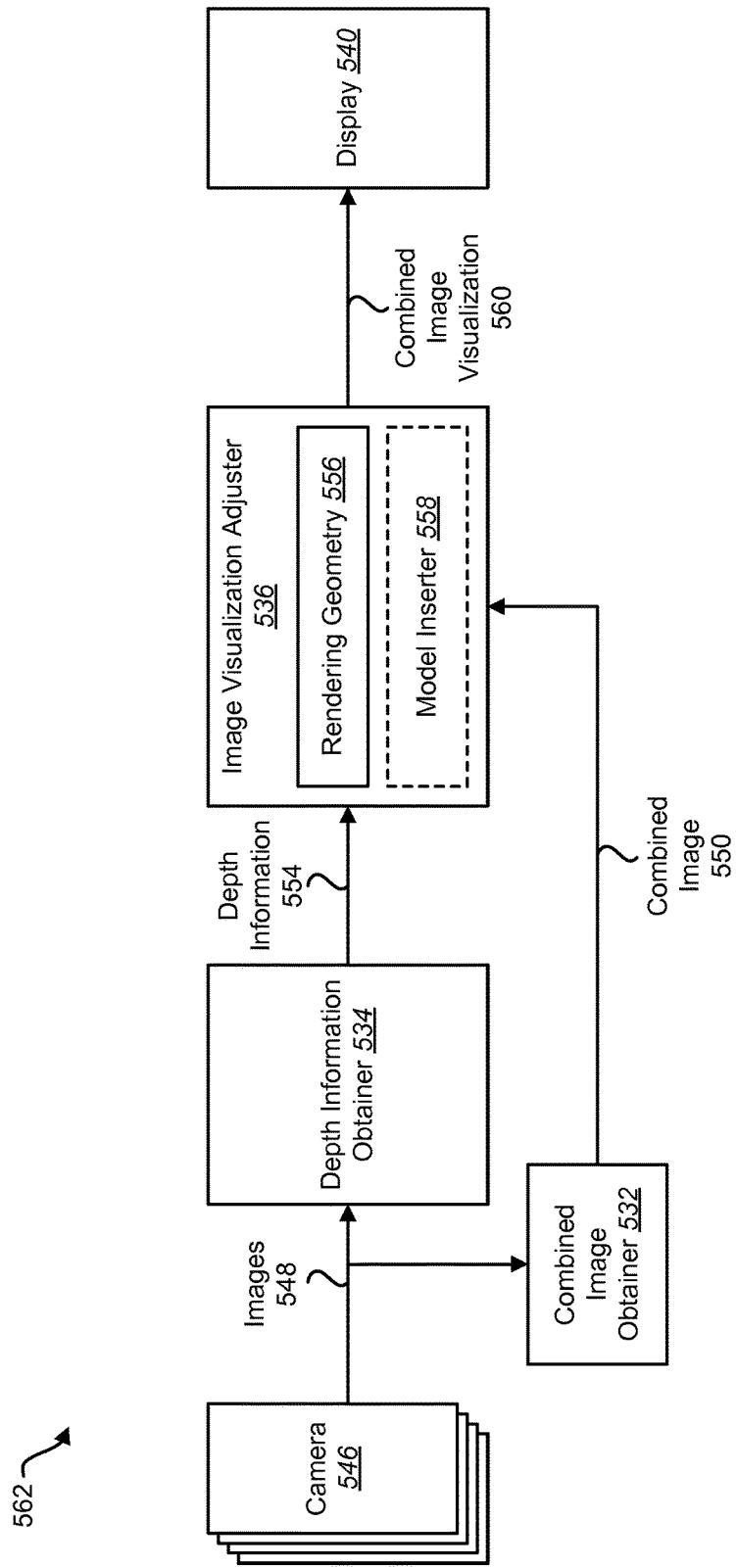
FIG. 5 is a diagram illustrating more specific examples of elements that may be implemented in accordance with the systems and methods disclosed herein.

FIG. 5 is a diagram illustrating more specific examples of elements 562 that may be implemented in accordance with the systems and methods disclosed herein. The elements 562 may include one or more cameras 546, a combined image obtainer 532, a depth information obtainer 534, an image visualization adjuster 536, and/or a display 540. One or more of the elements 562 may be implemented on the same electronic device or on separate electronic devices. In some configurations, one or more of the elements 562 may be examples of corresponding elements described in connection with FIG. 3. For example, one or more of the elements 562 described in connection with FIG. 5 may be implemented on the electronic device 322 described in connection with FIG. 3.

One or multiple cameras 546 may capture multiple images 548 (e.g., camera inputs). The cameras 546 may be examples of the image sensor(s) 324 and optical system(s) 326 described in connection with FIG. 3. For example, each camera 546 may include an image sensor and an optical system.

In some configurations, the camera(s) 546 may capture differing but overlapping images 548. In some examples, four cameras 546 may be mounted on different parts (e.g., sides) of a vehicle. For instance, one camera 546 may be mounted on the front of the vehicle, another camera 546 may be mounted on the right side (e.g., right side-view mirror housing) of the vehicle, another camera 546 may be mounted on the left side (e.g., left side-view mirror housing) of the vehicle, and yet another camera 546 may be mounted on the rear of the vehicle. In this way, the four cameras 546 may capture images 548 of a scene surrounding the vehicle.

In other examples, multiple cameras 546 may be mounted on other devices or bodies. In one example, multiple cameras 546 may be mounted on a drone to capture images 548 of a scene surrounding the drone. In another example, multiple (action) cameras 546 may be attached to a user (e.g., wearer) to capture images 548 of a scene surrounding the user. In yet other examples, multiple cameras 546 may be mounted in different locations on a smartphone, video camera, still camera, security camera, head-mounted device (e.g., virtual reality headset, augmented reality headset, mixed reality headset, helmet, glasses), gaming device, television, appliance, airplane, boat, bicycle, house, building, weapon (e.g., firearm), etc. These cameras 546 may capture multiple images 548 of a scene around the device or body that the cameras 546 are attached to. For example, the images 548 may portray adjacent and/or overlapping areas of the scene. In yet other examples, a single camera 546 may be rotated and/or moved to different positions and may capture a series of overlapping images 548. It should be noted that the images 548 may portray any or all of the areas to the sides of, above, and/or below the device or body. The images 548 may be provided to a depth information obtainer 534 and/or a combined image obtainer 532.

The combined image obtainer 532 may produce a combined image 550 based on the images 548. For example, the combined image obtainer 532 may merge the images 548 to produce a single continuous combined image 550 from the scene views of the images 548. The combined image obtainer 532 described in connection with FIG. 5 may be an example of the combined image obtainer 332 described in connection with FIG. 3. The combined image obtainer 532 may perform image alignment (e.g., registration), seam finding and/or merging as described above. In some configurations (where the image alignment and/or seam finding are predetermined, for example), the combined image obtainer 532 may directly merge the images 548. The combined image 550 may be provided to the image visualization adjuster 536.

The depth information obtainer 534 may obtain depth information 554 based on the images 548. The depth information obtainer 534 described in connection with FIG. 5 may be an example of the depth information obtainer 334 described in connection with FIG. 3. For example, the depth information obtainer 534 may obtain the depth information 554 based on stereoscopic triangulation, motion information and/or other depth sensing. The depth information 554 may be provided to the image visualization adjuster 536.

The image visualization adjuster 536 may produce and/or adjust a combined image visualization 560 based on the combined image 550 and the depth information 554. The image visualization adjuster 536 described in connection with FIG. 5 may be one example of the image visualization adjuster 336 described in connection with FIG. 3.

In some configurations, the image visualization adjuster 536 may render the combined image 550 onto a rendering geometry 556. For example, the rendering geometry 556 may be a shape onto which the combined image 550 may be rendered (e.g., projected, mapped, etc.). It should be noted that the image visualization adjuster 536 may utilize one or more rendering geometries 556. For example, the combined image 550 may be rendered onto one or more of the rendering geometries 556 to produce a surround view combined image visualization. For example, the surround view combined image visualization may show the scene surrounding a vehicle.

The image visualization adjuster 536 may adaptively adjust the combined image visualization (e.g., surround view combined image visualization) based on the depth information 554 as described in connection with FIG. 3. For example, the adjustment may be based on a nearest and/or average depth of one or more surrounding objects. For instance, the image visualization adjuster 536 may set the rendering geometry 556 (e.g., bowl or other 3D model) to fit the environment.

In some configurations, the image visualization adjuster 536 may adjust the rendering geometry 556, viewpoint, rotation, and/or shift of the combined image visualization based on the depth information 554. Additionally or alternatively, the image visualization adjuster 536 may insert at least one model, switch the rendering geometry 556, and/or mark (and/or highlight) one or more objects in the combined image visualization based on the depth information 554. Additionally or alternatively, the image visualization adjuster 536 may identify an ROI (based on object detection, for example). The image visualization adjuster 536 may optionally generate a magnifying window that presents a zoomed version of the ROI.

In some configurations, the image visualization adjuster 536 may include a model inserter 558. The model inserter 558 may insert at least one model corresponding to an object as described above in connection with FIG. 3. For example, the model inserter 558 may produce a pop-up 3D effect of one or more specific objects or some scene content that appears to pop-up from the rendering geometry 556 (e.g., bowl or other 3D model).

The resulting combined image visualization 560 may be provided to a display 540. The display 540 described in connection with FIG. 5 may be an example of the display 340 described in connection with FIG. 3. The display 540 may present the combined image visualization 560.

Figure 6:
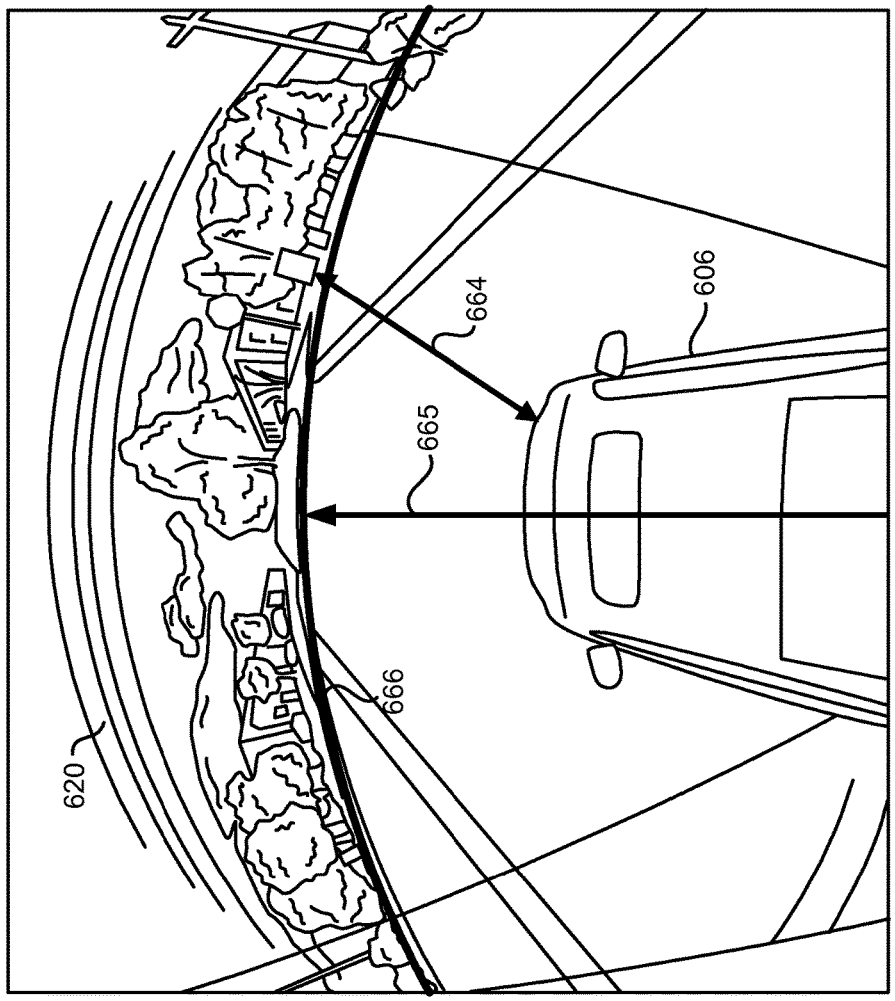
FIG. 6 illustrates one example of a combined image visualization in accordance with the systems and methods disclosed herein.

FIG. 6 illustrates one example of a combined image visualization 668 in accordance with the systems and methods disclosed herein. The combined image visualization 668 is a surround view (e.g., bowl shape). In this example, a vehicle 606 may include several cameras (e.g., 4: one mounted to the front, one mounted to the right, one mounted to the left, and one mounted to the rear). Images taken from the cameras may be combined as described above to produce a combined image. The combined image may be rendered on a rendering geometry 620. In this example, the vehicle 606 may obtain depth information indicating that the nearest object (e.g., a mailbox) is at a relatively large distance 664 (e.g., approximately 6 m) from the vehicle 606. It should be noted that the vehicle 606 may be depicted (e.g., inserted) as a model or representation of the actual vehicle 606 in an image visualization.

As can be observed in FIG. 6, a transition edge 666 of the rendering geometry 620 may be adjusted such that the base diameter 665 of the rendering geometry 620 extends nearly to the nearest object distance. Additionally, the viewpoint may be adjusted such that the viewing angle is relatively low to the ground, while being slightly above and behind the vehicle 606. These adjustments allow the combined image visualization 668 to appear more natural, such that the distant trees and buildings have a sense of height. In other approaches, the diameter (across the whole rendering geometry) may be additionally or alternatively adjusted based on the depth information (e.g., relative to the nearest object distance and/or average object distance). For example, the diameter may be adjusted to correspond to (or to be within some range from) the nearest object distance or an average object distance.

Figure 7:
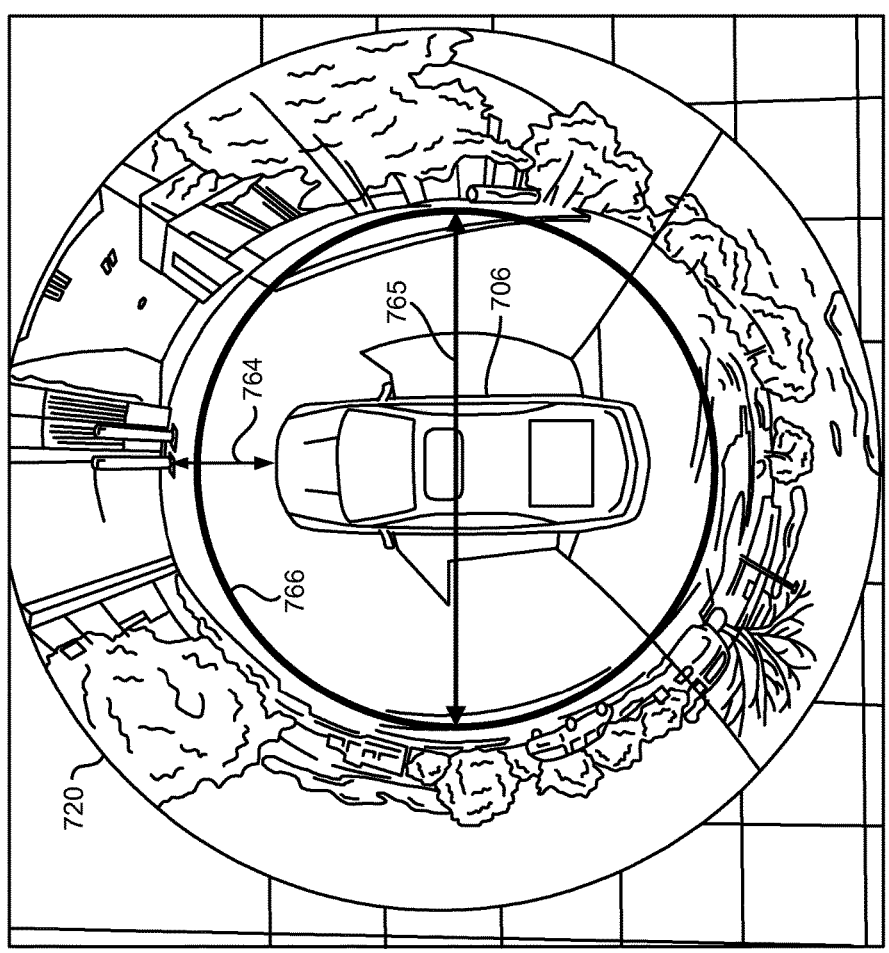
FIG. 7 illustrates another example of a combined image visualization in accordance with the systems and methods disclosed herein.

FIG. 7 illustrates another example of a combined image visualization 768 in accordance with the systems and methods disclosed herein. The combined image visualization 768 is a surround view (e.g., bowl shape). In this example, a vehicle 706 may include several cameras (e.g., 4: one mounted to the front, one mounted to the right, one mounted to the left, and one mounted to the rear). Images taken from the cameras may be combined as described above to produce a combined image. The combined image may be rendered on a rendering geometry 720. In this example, the vehicle 706 may obtain depth information indicating that the nearest object (e.g., a barrier) is at a medium distance 764 (e.g., approximately 3 m) from the vehicle 706. It should be noted that the vehicle 706 may be depicted (e.g., inserted) as a model or representation of the actual vehicle 706 in an image visualization.

As can be observed in FIG. 7, a transition edge 766 of the rendering geometry 720 may be adjusted such that the base diameter 765 of the rendering geometry 720 extends nearly to the nearest object. Additionally, the viewpoint may be adjusted such that the viewing angle is perpendicular to the ground (e.g., top-down), while being above the vehicle 706. These adjustments allow the combined image visualization 768 to show around the entire vehicle perimeter, while still allowing the trees and building to have a sense of height. This may assist a driver in navigating in a parking lot (e.g., backing up, turning around objects at a medium distance, etc.).

Figure 8:
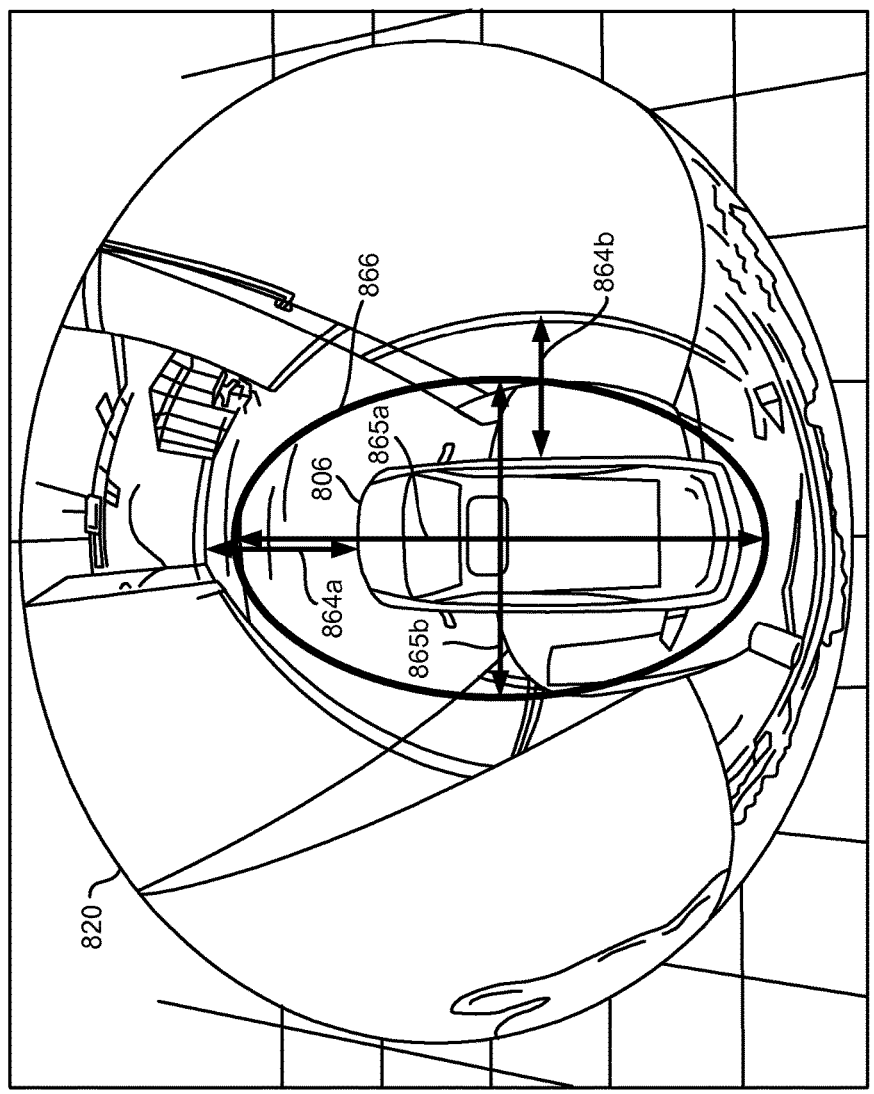
FIG. 8 illustrates yet another example of a combined image visualization in accordance with the systems and methods disclosed herein.

FIG. 8 illustrates yet another example of a combined image visualization 868 in accordance with the systems and methods disclosed herein. The combined image visualization 868 is a surround view (e.g., bowl shape). In this example, a vehicle 806 may include several cameras (e.g., 4: one mounted to the front, one mounted to the right, one mounted to the left, and one mounted to the rear). Images taken from the cameras may be combined as described above to produce a combined image. The combined image may be rendered on a rendering geometry 820. In this example, the vehicle 806 may obtain depth information indicating that the nearest object (e.g., a wall to the side) is at a close distance 864*a* (e.g., approximately 1.5 m) from the vehicle 806. As can be further observed, the distance 864*b* to the nearest object in front of the vehicle 806 is relatively great (approximately 8 m). In this example, the base of the rendering geometry 820 may be adjusted to be elliptical in shape, allowing the combined image visualization 868 to give both the walls to the sides of the vehicle 806 and the wall in front of the vehicle 806 a sense of height, while reducing the appearance of distortion on the ground.

As can be observed in FIG. 8, a transition edge 866 of the rendering geometry 820 may be adjusted such that the base length 865*a* of the rendering geometry 820 extends nearly to the wall in front of the vehicle 806 and the base width 865*b* of the rendering geometry 820 extends nearly to the wall on the side of the vehicle 806. Additionally, the viewpoint may be adjusted such that the viewing angle is high to the ground (e.g., approximately 70 degrees), while being above the vehicle 806. These adjustments allow the combined image visualization 868 to emphasize how close the wall is, while allowing the wall to have a sense of height. This may assist a driver in navigating in a close corridor or garage.

Figure 9:
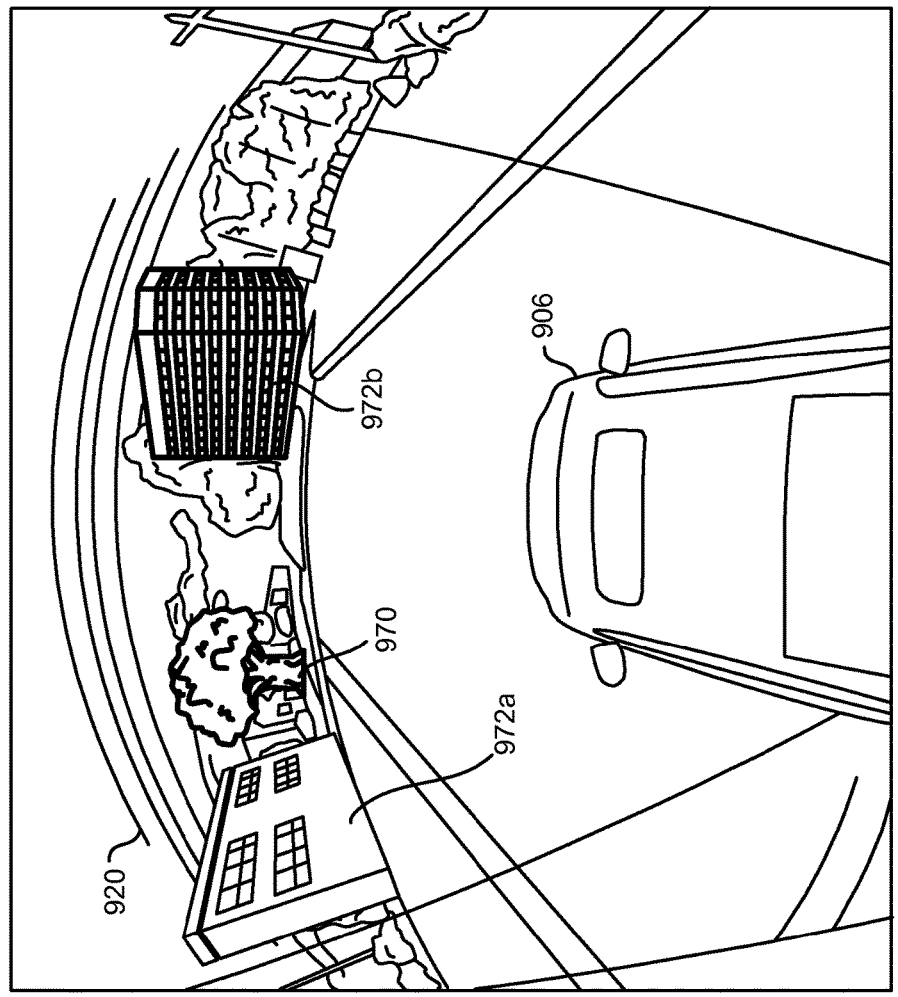
FIG. 9 illustrates yet another example of a combined image visualization in accordance with the systems and methods disclosed herein.

FIG. 9 illustrates yet another example of a combined image visualization 968 in accordance with the systems and methods disclosed herein. The combined image visualization 968 is a surround view (e.g., bowl shape). In this example, a vehicle 906 may include several cameras (e.g., 4: one mounted to the front, one mounted to the right, one mounted to the left, and one mounted to the rear). Images taken from the cameras may be combined as described above to produce a combined image. The combined image may be rendered on a rendering geometry 920. In this example, the vehicle 906 may obtain depth information indicating the distances to a tree 970 and some buildings 972*a*, 972*b*.

Models may be inserted into the rendering geometry 920. As illustrated, image data corresponding to the tree 970 and buildings 972*a*, 972*b* may be rendered on the models. This may provide a 3D effect in the combined image visualization 968.

Figure 10:
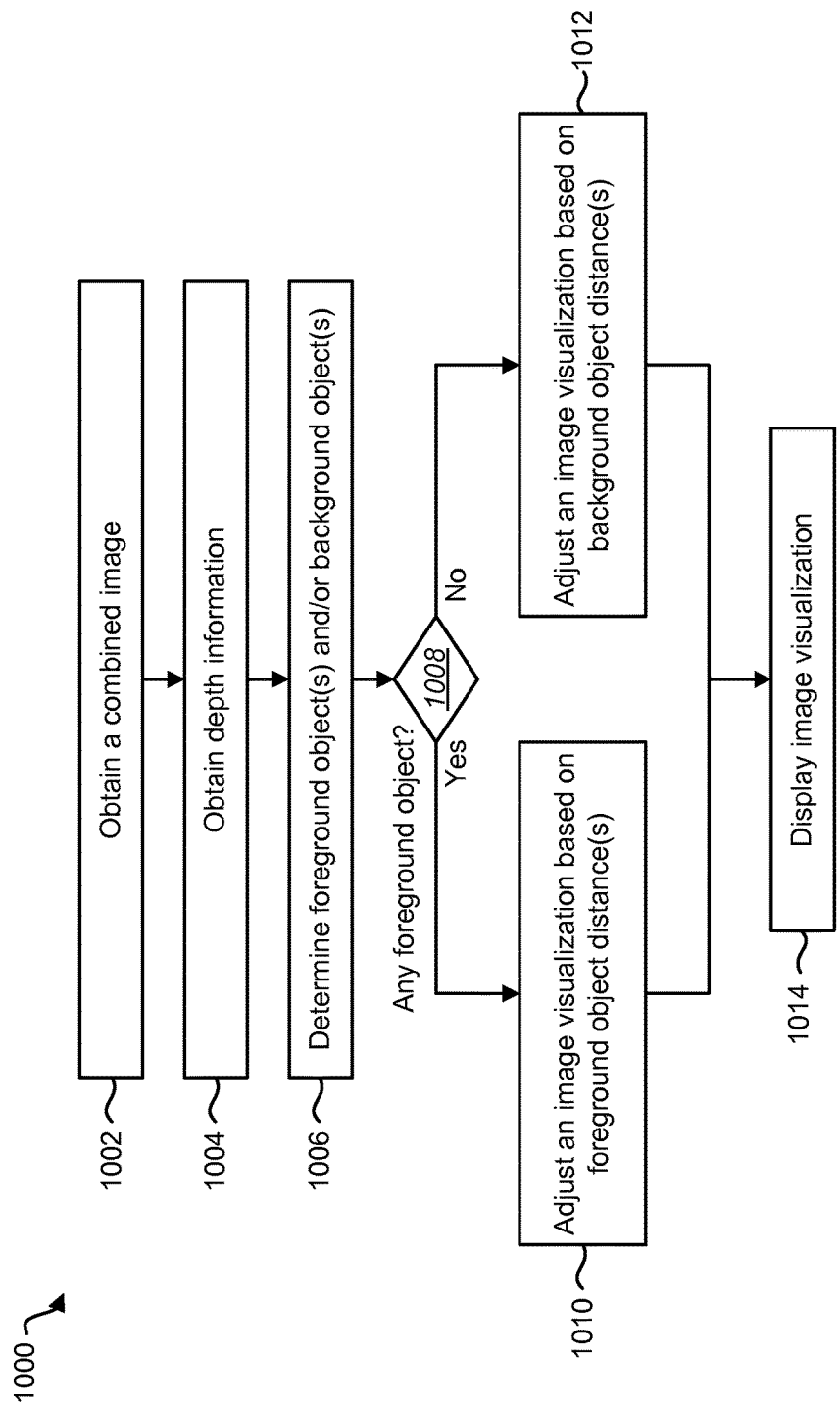
FIG. 10 is a flow diagram illustrating a more specific configuration of a method for producing an image visualization.

FIG. 10 is a flow diagram illustrating a more specific configuration of a method 1000 for producing an image visualization. The method 1000 may be performed by the electronic device 322 described herein, for example.

The electronic device 322 may obtain 1002 a combined image. This may be accomplished as described in connection with one or more of FIGS. 1-4.

The electronic device 322 may obtain 1004 depth information. This may be accomplished as described in connection with one or more of FIGS. 3 and 4.

The electronic device 322 may determine 1006 one or more foreground objects and/or one or more background objects. For example, the electronic device 322 may determine 1006 which of one or more objects (if any) in a scene are foreground objects or are background objects. As described above, for instance, camera parameters (e.g., pre-calculated camera parameters) and/or relative location distance may be utilized to construct a depth map (e.g., a combined depth map) and to calculate scene distance. A scene may include background objects, such as distant buildings, trees, etc. The scene may additionally or alternatively include foreground objects such as pedestrians and vehicles. Of the objects detected in the scene, the electronic device 322 (e.g., depth information obtainer 334) may determine which object(s) are foreground object(s) and/or which object(s) are background objects. For example, the electronic device 322 may sort the objects into foreground object and background object categories. In some approaches, the electronic device 322 (e.g., depth information obtainer 334) may identify any objects that are nearer than a threshold distance as foreground objects and any objects that are further than the threshold distance to be background objects. In some configurations, there may not be a fixed threshold distance (as the foreground objects may be moving objects such as pedestrians and vehicles, for example).

The electronic device 322 may determine 1008 whether there is any foreground object in the image (e.g., combined image). If there is at least one foreground object, the electronic device 322 (e.g., image visualization adjuster 336) may adjust 1010 the image visualization based on one or more foreground object distances. For example, the electronic device 322 may adjust 1010 the image visualization based on the nearest foreground object distance and/or an average distance of foreground objects.

Some approaches for adjusting rendering geometry (e.g., defining geometry width) may be based on the average foreground object depth (e.g., an average of all foreground object distances). For example, an average foreground object depth may be defined as $$D = \frac{\sum_{i=1}^{N} d_i}{N},$$

where $d_i$ is a distance to a foreground object with index i and N is a total number of foreground objects. One or more foreground objects for which $d_i < D$ may be utilized to control the rendering geometry. For example, the electronic device 322 may adjust one or more parameters (e.g., a diameter, radius, width, length, curved surface angle, etc.) of the rendering geometry relative to (e.g., such that they correspond to or are within some range of) the nearest foreground object distance or the average foreground object distance.

In a case that there are no foreground objects in the image (e.g., $d_i=0$ and $D=0$), the electronic device 322 (e.g., image visualization adjuster 336) may adjust 1012 the image visualization (e.g., the combined image visualization) based on one or more background object distances. For example, the electronic device 322 may adjust one or more parameters (e.g., a diameter) such that a dimension of the rendering geometry is equal to (or within some range of) the nearest background object distance or the average background object distance.

It should be noted that in some configurations, the electronic device 322 may perform one or more additional adjustments as described above. For example, the electronic device 322 may insert a model (e.g., a pop-up 3D effect of a specific object or some scene content or other 3D model). One or more of the adjustments described herein may be based on a dynamic and real-time scene.

In some configurations, the electronic device 322 may display 1014 the combined image visualization. This may be accomplished as described in connection with one or more of FIGS. 3 and 4.

Figure 11:
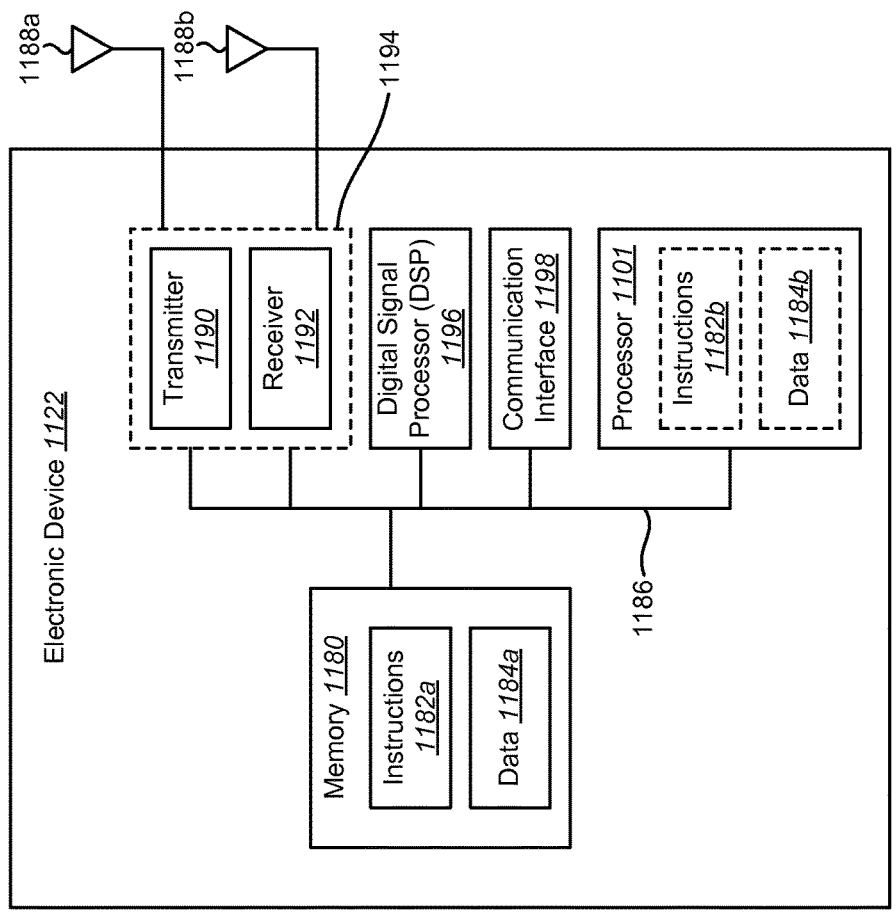
FIG. 11 illustrates certain components that may be included within an electronic device configured to implement various configurations of the systems and methods disclosed herein.

FIG. 11 illustrates certain components that may be included within an electronic device 1122 configured to implement various configurations of the systems and methods disclosed herein. Examples of the electronic device 1122 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, etc. The electronic device 1122 may be implemented in accordance with the electronic device 322 described in connection with FIG. 3. The electronic device 1122 includes a processor 1101. The processor 1101 may be a general purpose single- or multi-chip microprocessor (e.g., an ARM), a special purpose microprocessor (e.g., a digital signal processor (DSP)), a microcontroller, a programmable gate array, etc. The processor 1101 may be referred to as a central processing unit (CPU). Although just a single processor 1101 is shown in the electronic device 1122, in an alternative configuration, a combination of processors (e.g., an ARM and DSP) could be implemented.

The electronic device 1122 also includes memory 1180. The memory 1180 may be any electronic component capable of storing electronic information. The memory 1180 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1184*a* and instructions 1182*a* may be stored in the memory 1180. The instructions 1182*a* may be executable by the processor 1101 to implement one or more of the methods (e.g., method 400, method 1000), procedures, steps, and/or functions described herein. Executing the instructions 1182*a* may involve the use of the data 1184*a* that is stored in the memory 1180. When the processor 1101 executes the instructions 1182, various portions of the instructions 1182*b* may be loaded onto the processor 1101 and/or various pieces of data 1184*b* may be loaded onto the processor 1101.

The electronic device 1122 may also include a transmitter 1190 and a receiver 1192 to allow transmission and reception of signals to and from the electronic device 1122. The transmitter 1190 and receiver 1192 may be collectively referred to as a transceiver 1194. One or more antennas 1188*a-b* may be electrically coupled to the transceiver 1194. The electronic device 1122 may also include (not shown) multiple transmitters, multiple receivers, multiple transceivers and/or additional antennas.

The electronic device 1122 may include a digital signal processor (DSP) 1196. The electronic device 1122 may also include a communication interface 1198. The communication interface 1198 may allow and/or enable one or more kinds of input and/or output. For example, the communication interface 1198 may include one or more ports and/or communication devices for linking other devices to the electronic device 1122. In some configurations, the communication interface 1198 may include the transmitter 1190, the receiver 1192, or both (e.g., the transceiver 1194). Additionally or alternatively, the communication interface 1198 may include one or more other interfaces (e.g., touchscreen, keypad, keyboard, microphone, camera, etc.). For example, the communication interface 1198 may enable a user to interact with the electronic device 1122.

The various components of the electronic device 1122 may be coupled together by one or more buses, which may include a power bus, a control signal bus, a status signal bus, a data bus, etc. For the sake of clarity, the various buses are illustrated in FIG. 11 as a bus system 1186.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise any medium that can be used to carry or store desired program code in the form of instructions or data structures and that can be accessed by a computer. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
    obtaining a combined image of a scene surrounding a device, wherein the combined image comprises a combination of images captured from one or more image sensors;
    obtaining depth information, wherein the depth information is based on a distance measurement between a depth sensor and at least one object in the combined image; and
    rendering the combined image of the scene surrounding the device onto a rendering geometry, wherein the rendering geometry comprises a three-dimensional shape, and wherein a dimension of the three-dimensional shape of the rendering geometry for a combined image visualization is determined based on a distance to a nearest foreground object indicated by the depth information.

2. The method of claim 1, wherein determining the rendering geometry for the combined image visualization comprises adjusting the rendering geometry such that the at least one object is rendered on a vertical portion of the rendering geometry.

3. The method of claim 1, further comprising inserting at least one model into a three-dimensional space of the combined image visualization, wherein the model corresponds to the at least one object.

4. The method of claim 1, wherein the at least one object comprises a plurality of objects, and wherein the depth information indicates an average object distance between the depth sensor and the plurality of objects.

5. The method of claim 1, wherein the depth information is dynamic.

6. The method of claim 1, further comprising:
    identifying a region of interest based on object detection; and zooming at least a portion of the combined image visualization based on the region of interest.

7. The method of claim 1, further comprising reducing perspective distortion for the combined image visualization.

8. The method of claim 1, wherein the combined image visualization is a surround view.

9. An electronic device, comprising:
a processor configured to:
obtain a combined image of a scene surrounding a device, wherein the combined image comprises a combination of images captured from one or more image sensors;
obtain depth information, wherein the depth information is based on a distance measurement between a depth sensor and at least one object in the combined image; and
render the combined image of the scene surrounding the device onto a rendering geometry, wherein the rendering geometry comprises a three-dimensional shape, and wherein a dimension of the three-dimensional shape of the rendering geometry for a combined image visualization is determined based on a distance to a nearest foreground object indicated by the depth information.

10. The electronic device of claim 9, wherein the processor is configured to determine the rendering geometry such that the at least one object is rendered on a vertical portion of the rendering geometry.

11. The electronic device of claim 9, wherein the processor is configured to insert at least one model into a three-dimensional space of the combined image visualization, wherein the model corresponds to the at least one object.

12. The electronic device of claim 9, wherein the at least one object comprises a plurality of objects, and wherein the depth information indicates an average object distance between the depth sensor and the plurality of objects.

13. The electronic device of claim 9, wherein the depth information is dynamic.

14. The electronic device of claim 9, wherein the processor is configured to:
identify a region of interest based on object detection; and
zoom at least a portion of the combined image visualization based on the region of interest.

15. The electronic device of claim 9, wherein the processor is configured to reduce perspective distortion for the combined image visualization.

16. The electronic device of claim 9, wherein the combined image visualization is a surround view.

17. An apparatus, comprising:
means for obtaining a combined image of a scene surrounding a device, wherein the combined image comprises a combination of images captured from one or more image sensors;
means for obtaining depth information, wherein the depth information is based on a distance measurement between a depth sensor and at least one object in the combined image; and
means for rendering the combined image of the scene surrounding the device onto a rendering geometry, wherein the rendering geometry comprises a three-dimensional shape, and wherein a dimension of the three-dimensional shape of the rendering geometry for a combined image visualization is determined based on a distance to a nearest foreground object indicated by the depth information.

18. The apparatus of claim 17, further comprising means for inserting at least one model into a three-dimensional space of the combined image visualization, wherein the model corresponds to the at least one object.

19. The apparatus of claim 17, wherein the at least one object comprises a plurality of objects, and wherein the depth information indicates an average object distance between the depth sensor and the plurality of objects.

20. A computer-program product, comprising a non-transitory tangible computer-readable medium having instructions thereon, the instructions comprising:
code for causing an electronic device to obtain a combined image of a scene surrounding a device, wherein the combined image comprises a combination of images captured from one or more image sensors;
code for causing the electronic device to obtain depth information, wherein the depth information is based on a distance measurement between a depth sensor and at least one object in the combined image; and
code for causing the electronic device to render the combined image of the scene surrounding the device onto a rendering geometry, wherein the rendering geometry comprises a three-dimensional shape, and wherein a dimension of the three-dimensional shape of the rendering geometry for a combined image visualization is determined based on a distance to a nearest foreground object indicated by the depth information.

21. The computer-program product of claim 20, further comprising code for causing the electronic device to insert at least one model into a three-dimensional space of the combined image visualization, wherein the model corresponds to the at least one object.

22. The computer-program product of claim 20, wherein the at least one object comprises a plurality of objects, and wherein the depth information indicates an average object distance between the depth sensor and the plurality of objects.

* * * * *